United States Patent Office 3,676,119
Patented July 11, 1972

3,676,119
SPECTRAL SENSITIZATION OF PHOTOCONDUC-
TIVE COMPOSITIONS
Henri Depoorter, Mortsel, and Theofiel Hubert Ghys,
Kontich, Belgium, assignors to Agfa-Gevaert, Mortsel,
Belgium
No Drawing. Filed Dec. 30, 1969, Ser. No. 889,338
Claims priority, application Great Britain, Jan. 20, 1969,
3,157/69
Int. Cl. G03g 7/00, 5/08
U.S. Cl. 96—1.7
10 Claims

ABSTRACT OF THE DISCLOSURE

An electrophotographic recording material comprising an inorganic photoconductive substance, especially zinc oxide, is described wherein the said substance is spectrally sensitized by means of a dye corresponding to the formula:

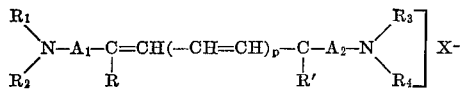

wherein:

each of $A_1$ and $A_2$ stands for an arylene group,
each of $R_1$, $R_2$, $R_3$ and $R_4$ represents an alkyl group, a cylcloalkyl group, an aralkyl group or an aryl group or $R_1+R_2$ and/or $R_3+R_4$ together represent the atoms necessary to close a heterocycle,
each of R and R' represents hydrogen, alkyl, cycloalkyl, aralkyl or aryl,
$p$ is 0, 1 or 2, and
$X^-$ is an anion.

The dyes have a favorable sensitizing action and confer only a very low and neutral coloring to the photoconductive layer.

---

The present invention relates to the spectral sensitization of photoconductive compositions, to such spectrally sensitized compositions and to recording materials prepared therewith.

Spectral sensitization of photoconductive compositions can be performed with methine dyes as described e.g. in U.S. Pat. No. 3,128,179. The dyes proposed for the spectral sensitization of photoconductive compounds have a sensitizing action only for a well defined part of the visible spectrum. Moreover, these spectral sensitizers having their main absorption in the visible region of the spectrum, strongly dye the photoconductive layer when used in the required amount and therefore necessitate, as described in United Kingdom patent specification 1,020,-755, the use of additional dyes compensating the undesirable colouring of the photoconductive layer. In practice, a mixture of at least two—most often more than two—dyes must be used for obtaining a high sensitivity when exposing a photoconductive layer to an illuminating source such as an ordinary light bulb and/or for obtaining a neutral tint of the photoconductive layer.

Therefore, it is an object of the present invention to provide a class of stable spectral sensitizing agents for photoconductive compositions, which have favourable spectral sensitizing effects and do not have the mentioned disadvantages.

Said object can be accomplished by the use of tri-, penta- or hepta-methine dyes in which the methine chain is terminated at each end by substituted p-aminobenzene rings and which correspond to the following general formula:

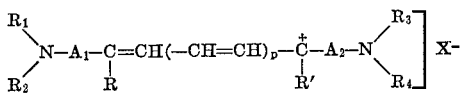

wherein:

each of $A_1$ and $A_2$ stands for arylene, preferably phenylene including substituted arylene,
each of $R_1$, $R_2$, $R_3$ and $R_4$ stands for alkyl including substituted alkyl, cycloalkyl including substituted cycloalkyl, aralkyl including substituted aralkyl or aryl including substituted aryl, or $R_1+R_2$ and/or $R_3+R_4$ together represent the atoms necessary to form a heterocyclic ring including a substituted heterocyclic ring such as pyrroline, pyrrolidine, morpholine, etc.,
each of R and R' represents a hydrogen atom, an alkyl group including a substituted alkyl group, a cycloalkyl group including a substituted cycloalkyl group, an aralkyl group including a substituted aralkyl group, or an aryl group including a substituted aryl group,
$p$ stands for 0, 1 or 2, and
$X^-$ represents an anion such as a chloride ion, a bromide ion, an iodide ion, a perchlorate ion, a benzene sulphonate ion, a p-toluenesulphonate ion, a methylsulphate ion, an ethylsulphate ion and a propylsulphate ion.

By appropriate choice of the substituents and methine chain length the characteristics of the sensitizers of the invention as regards sensitizing range, solubility, etc. can be adapted to the necessities.

The following is a non-limitative list of representative examples of methine dyes of use according to the present invention.

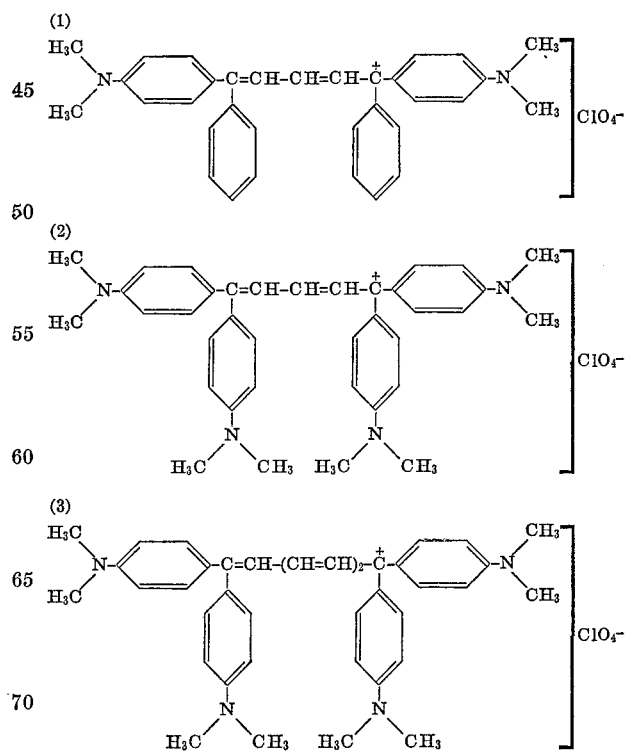

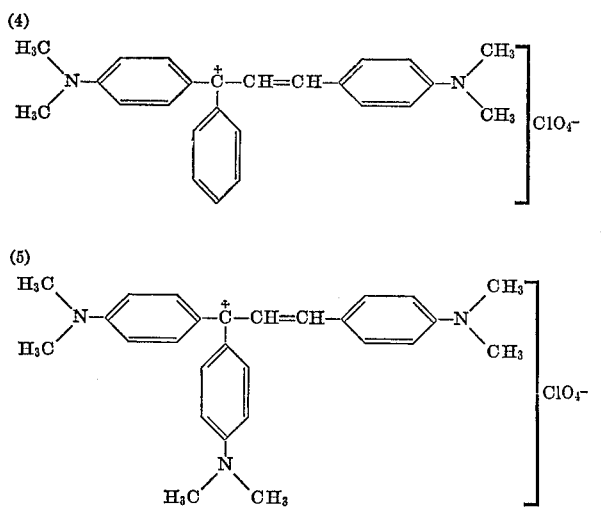

The methine dyes of use according to the present invention can be prepared as is known by those skilled in the art and described in the literature e.g. in J. Am. Chem. Soc. 80, 3772 (1958), Helv. Chem. Acta. 24, 369 E (1941) and Helv. Chem. Acta 28, 600 (1945).

The methine dyes corresponding to the above general formula are particularly useful for spectrally sensitizing inorganic photoconductive compounds e.g. photoconductive zinc oxide dispersed in a binder.

A photoconductive layer when sensitized by means of a dye of use according to the present invention possesses a uniform sensitivity in the visible region of the spectrum and a high general sensitivity when exposed to an ordinary light bulb. Therefore, in accordance with the present invention it suffices to add one single sensitizer to the photoconductive composition in order to obtain the desired sensitivity where otherwise two or more spectral sensitizers are required to obtain the same effect.

Apart from having a favourable sensitizing action the dyes according to the present invention confer only a very low and neutral colouring to the photoconductive layer owing to the fact that the main absorption maximum of the dyes is situated beyond 700 nm., i.e. beyond the visible region of the spectrum. Thus, in accordance with the present invention there can be dispensed with the use of compensating dyes as described above.

The sensitzing dyes used in the present invention can be allowed to adsorb to inorganic photoconductive substances, preferably photoconductive zinc oxide, by adding them to a dispersion of that substance in an organic or aqueous medium either or not already containing the binder.

Zinc oxide recording layers applied from organic solvents and binding agents soluble in the organic medium and described e.g., in the Belgian patent specifications 612,102 and 714,257.

Zinc oxide recording layers applied from an aqueous medium are described in the United Kingdom patent specifications 1,125,579 and 1,125,580.

The spectral sensitizing agents are preferably added in dissolved state, e.g. dissolved in a water-miscible solvent or in water, to a dispersion of the photoconductive substance. When applied in an aqueous zinc oxide dispersion they are preferably incorporated into the recording layer from an organic liquid consisting of or containing a solvent, which has a very low vapour pressure and which is at least for 20% by weight soluble in water at 20° C. Such a method for sensitizing a photoconductive material is described in the United Kingdom patent specification 1,154,613, which should be read in conjunction herewith.

Suitable dispersing agents for dispersing photoconductive zinc oxide in an aqueous medium are described in the French patent specification 1,540,020 which application should also be read in conjunction herewith.

The optimum quantity of sensitizing agent per gram of photoconductive substance can be determined easily by a series of tests. A useful range is comprised between 0.01 mg. and 2 mg. per gram of photoconductive zinc oxide. The weight ratio of zinc oxide to binder may vary between relatively large limits. A ratio of 1 part by weight of photoconductive substance to 0.1 to 0.6 part by weight of total content of binder is preferred. Advantageously the coating mixture contains dispersed photoconductive zinc oxide in a weight ratio of 95% to 60% in respect of the total solids content of the coated and dried layer. The thickness of the photoconductive layer may be chosen between wide limits according to the requirements of each case. Good recording and reproduction results are attained with electrophotographic layers having a thickness of 1 to $20\mu$, and preferably of 3 to $10\mu$.

Preferably the sensitizing substances are used in combination with photoconductive zinc oxide prepared according to the French process.

The photoconductive recording layers containing a spectral sensitizing agent as above described may contain, in addition to the photoconductive substance(s) and the binder, spectral sensitizers of any other type (see e.g. United Kingdom patent specification 1,020,504), compounds increasing the dark-resistivity, e.g. the phosphorus compounds described in the Belgian patent specification 612,102, and additives known in coating techniques e.g. pigments (see e.g. United Kingdom patent specification 1,007,349), compounds influencing the gloss and/or the viscosity, and compounds that counteract aging and/or oxidation of the layers, or which influence the thermal stability of the layers. When selecting any additives, preference is given to those which least reduce the dark-resistivity of the photoconductive layer.

The photoconductive composition sensitized according to the present invention may be coated on a support according to a known coating technique, e.g. by spraying, whirling, dip-coating, or by a coating technique wherein use is made of a doctor blade. The supports or base materials are chosen in view of the particular charging, exposure, recording, development and/or transfer technique wherein the recording material is used.

In electrophotographic recording techniques, wherein the photoconductive layer is electrostatically charged, the support preferably has an electric volume resistivity, which is considerably lower than that of the recording layer. Suitable supports are described e.g. in the United Kingdom patent specifications 995,491, 1,020,503 and 1,020,504, and in the United States Pat. No. 3,008,825.

The photoconductive layer of an electrophotographic material, which is prepared starting from a coating composition according to the present invention, can be used for recording purposes, in which prior to exposure an electric charge is non-differentially applied according to known methods. However, the material can also be used in recording techniques, in which the exposure step precedes the charging step. For such a technique we may refer to e.g. the United Kingdom patent specifications 1,033,419 and 1,033,420.

For comparison of the sensitivity of photoconductive recording elements, said elements are exposed in the same manner, e.g. through a step-wedge, and developed in the same conditions. Well established methods of developing electrostatic images include cascade-, powder cloud-, magnetic brush- and fur brush-development. These methods are based on the application of charged dry toner to the surface bearing the electrostatic image. Other methods are based on the use of liquids, either insulating (electrophoretic development) or conductive liquids (see e.g. the U.S. Pat. No. 2,907,674 and the Belgian patent specifications 610,060 and 625,335). Development of a conductivity image based on electrolysis is described e.g. by J. A. Amick, RCA Rev., 20,753 (1959).

The following example illustrates the present invention.

EXAMPLE

An amount of 20 g. of photoconductive zinc oxide, 25 cc. of water and 1 cc. of a 10% solution of copoly (maleic anhydride/N-vinylpyrrolidone) (51.7/48.3) in a concentrated technical ammonia-water (1:9) solution is mixed for 10 minutes with a high speed stirrer such as a Kothoff mixer. The dispersion is then added to a solution of 2 g. of poly(vinylacetate/crotonic acid) (94.4/5.6) and 1.25 ml. of Cassurit-MLP (partially etherified melamine-formaldehyde resin marketed as an 80% aqueous solution by Cassella Farbwerke, Mainkur A.G., Frankfurt am Main, Germany) in 25 cc. of water and 1 cc. of a concentrated aqueous ammonia solution (25% by weight). The composition obtained is sensitized by one of the sensitizing agents mentioned in the following table. Each sensitizing dye is added in an amount of 0.5 mg. per gram of zinc oxide in the form of a 0.1% by weight solution in dimethyl formamide and is intimately mixed with the ground composition.

Each sensitized composition is coated pro rata of 25 g. of zinc oxide per sq. m. on a baryta paper weighting 90 g./sq. m.

After having been dried, the obtained layers are charged, exposed for 15 sec. with an irradiation intensity of 2280 lux by means of an incandescent lamp of 450 watt through a step wedge having a constant 0.1.

The differently sensitized layers are developed electrophoretically. The sensitivity of the obtained recording layers is expressed by the number of steps corresponding with the discharged areas on which no developing particles are deposited, which areas thus kept the original density of the recording layer. The higher this number, the more sensitive the layer.

TABLE

| Dyestuff of formule | Sensitivity (number of non-blackened areas) | Sensitization maximum (nm.) |
| --- | --- | --- |
|  | 10 |  |
| 1 | 18 | 840 |
| 2 | 20 | 645/820 |
| 3 | 16 | 925 |
| 5 | 17 | 710 |

We claim:

1. A recording material comprising an inorganic photoconductive substance, the photo-sensitivity of which is increased by a compound corresponding to the following general formula:

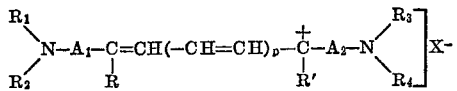

wherein:
each of $A_1$ and $A_2$ (the same or different) stands for a phenylene group,
each of $R_1$, $R_2$, $R_3$ and $R_4$ (the same or different) stands for an alkyl group, a cycloalkyl group, an aralkyl group, or an aryl group, or $R_1+R_2$ and/or $R_3+R_4$ together represent the atoms necessary to close a heterocyclic ring,
each of R and R' (the same or different) stands for hydrogen, an alkyl group, a cycloalkyl group, an aralkyl group or an aryl group,
p stands for 0, 1 or 2, and
$X^-$ stands for an anion.

2. A recording material according to claim 1, wherein each of R and R' (the same or different) stands for hydrogen, phenyl or p-dialkylaminophenyl, and each of $R_1$, $R_2$, $R_3$ and $R_4$ (the same or different) stands for an alkyl group comprising at most 5 C-atoms.

3. A recording material according to claim 2, wherein said inorganic photoconductive compound is zinc oxide.

4. A recording material according to claim 3, wherein said material is prepared starting from a photoconductive composition containing water.

5. A recording material according to claim 4, containing a photoconductive layer comprising photoconductive zinc oxide dispersed in a binder, which during the coating step was dissolved in an aqueous alkaline medium.

6. A recording material according to claim 1, wherein the sensitizer, in the formation of the photoconductive coating, has been dissolved in an organic solvent having a low vapour pressure and being at least soluble in water at 20° C. up to 20% by weight.

7. A recording material according to claim 6, wherein said solvent is dimethyl formamide.

8. A process for spectrally sensitizing an inorganic photoconductive substance by allowing to adsorb thereon a compound according to the general formula:

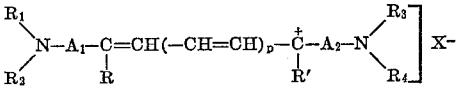

wherein:
each of $A_1$ and $A_2$ (the same or different) stands for a phenylene group,
each of $R_1$, $R_2$, $R_3$ and $R_4$ (the same or different) stands for an alkyl group, a cycloalkyl group, an aralkyl group, or an aryl group, or $R_1+R_2$ and/or $R_3+R_4$ together represent the atoms necessary to close a heterocyclic ring,
each of R and R' (the same or different) stands for hydrogen, an alkyl group, a cycloalkyl group, an aralkyl group, or an aryl group,
p stands for 0, 1 or 2, and
$X^-$ stands for an anion.

9. A process according to claim 8, wherein each of R and R' (the same or different) stands for hydrogen, phenyl or p-dialkylaminophenyl, and each of $R_1$, $R_2$, $R_3$ and $R_4$ (the same or different) stands for an alkyl group comprising at most 5 C-atoms.

10. A process according to claim 9, wherein the photoconductive inorganic substance is photoconductive zinc oxide.

References Cited

UNITED STATES PATENTS 2,860,984  11/1958  Jones _____ 96—104
3,094,418   6/1963  Heseltine et al. _____ 96—84
3,468,661   9/1969  Libeer et al. _____ 96—1.7

CHARLES E. VAN HORN, Primary Examiner
M. B. WITTENBERG, Assistant Examiner

U.S. Cl. X.R.
96—1.6; 252—501